US012711206B2

(12) United States Patent
Paulraj et al.

(10) Patent No.: US 12,711,206 B2
(45) Date of Patent: Aug. 18, 2026

(54) MANAGING ENTITLEMENT TO USE SOFTWARE BY COMPONENTS OF A DATA PROCESSING SYSTEM

(71) Applicant: Dell Products L.P., Round Rock, TX (US)

(72) Inventors: Deepaganesh Paulraj, Bangalore (IN); Vinod Parackal Saby, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/785,231

(22) Filed: Jul. 26, 2024

(65) Prior Publication Data

US 2026/0030327 A1 Jan. 29, 2026

(51) Int. Cl.
*G06F 21/12* (2013.01)
*G06F 21/60* (2013.01)

(52) U.S. Cl.
CPC ............ *G06F 21/12* (2013.01); *G06F 21/602* (2013.01)

(58) Field of Classification Search
CPC ............................... G06F 21/12; G06F 21/602
See application file for complete search history.

(56) References Cited

U.S. PATENT DOCUMENTS 6,976,087 B1 12/2005 Westfall
7,024,593 B1 4/2006 Budd
7,089,335 B2 8/2006 Aiken
7,974,286 B2 7/2011 Keohane et al.
8,826,307 B2 9/2014 Nagampalli
10,075,334 B1 9/2018 Kozura
11,252,192 B1 2/2022 Kwan
2004/0128514 A1 7/2004 Rhoads
2005/0048924 A1 3/2005 Nelson
2005/0078088 A1 4/2005 Davis
(Continued)

OTHER PUBLICATIONS

Cycuity, “Detect and Prevent Security Vulnerabilities in your Hardware Root of Trust,” 2022. Web Page <https://cycuity.com/wp-content/uploads/2022/06/Cycuity_White-Paper_Detect-Security-Vulnerabilities-HRoT.pdf> accessed on Jul. 23, 2024 (17 Pages).
(Continued)

*Primary Examiner* — Sangseok Park
(74) *Attorney, Agent, or Firm* — WOMBLE BOND DICKINSON (US) LLP

(57) ABSTRACT

Methods and systems for managing operations of a data processing system are disclosed. To manage operations of the data processing system, an identification may be made that a channel card of the data processing system is a non-standard channel card configured to perform at least one non-standard function. Based on the identification, a management controller of the data processing system may obtain a signed data structure indicating an entitlement for the channel card, the signed data structure including a signature usable to verify the channel card is entitled to use of proprietary software. The management controller may perform a verification process to determine whether the signed data structure is usable to establish the entitlement via at least an out-of-band interaction with a remote system. If the signed data structure is usable to establish the entitlement, computer-implemented services may be provided using the channel card and the proprietary software.

20 Claims, 7 Drawing Sheets

(56) References Cited

U.S. PATENT DOCUMENTS

2006/0143543 A1 6/2006 Mandrell
2006/0285502 A1 12/2006 Bigioi
2009/0069049 A1 3/2009 Jain
2009/0265720 A1 10/2009 Nagampalli
2012/0257118 A1 10/2012 Aotake
2013/0117766 A1 5/2013 Bax
2013/0283380 A1 10/2013 Thadikaran
2015/0213355 A1 7/2015 Sharma
2016/0142243 A1 5/2016 Karam
2016/0173578 A1 6/2016 Sharma
2019/0306018 A1 10/2019 Steverson
2019/0342079 A1 11/2019 Rudzitis
2020/0344325 A1 10/2020 Sarisky
2020/0396128 A1 12/2020 Tseng
2021/0097186 A1 4/2021 Mandal
2021/0120104 A1 4/2021 Al-Mufti
2022/0035685 A1* 2/2022 Ghosh .................. G06F 11/302
2022/0091744 A1 3/2022 Kutner
2022/0100840 A1 3/2022 Shtalenkov
2022/0121619 A1* 4/2022 Sharma ................ G06F 16/122
2022/0151022 A1 5/2022 Chikkur Dattatraya
2022/0207463 A1* 6/2022 Young .................. G06F 21/575
2023/0259632 A1 8/2023 Marciano
2023/0328037 A1 10/2023 Sankaranarayanan
2024/0267251 A1 8/2024 Mishelevich
2025/0148078 A1 5/2025 Lal

OTHER PUBLICATIONS

Elmaghbub, Abdurrahman, et al., "Domain-Agnostic Hardware Fingerprinting-Based Device Identifier for Zero-Trust IoT Security," IEEE Wireless Communications 31.2 (2024) (7 Pages).
Rostami, Mohamadreza, et al. "Beyond random inputs: A novel ml-based hardware fuzzing." 2024 Design, Automation & Test in Europe Conference & Exhibition. IEEE. (2024) (6 Pages).
Gaikwad, Pravin, et al. "Third-party hardware IP assurance against Trojans through supervised learning and post-processing." arXiv preprint arXiv:2111.14956. IEEE. (2021) (13 Pages).
Integrated Dell Remote Access Controller 9 User's Guide Published Dec. 2021 (368 pages).

* cited by examiner

MANAGING ENTITLEMENT TO USE SOFTWARE BY COMPONENTS OF A DATA PROCESSING SYSTEM

FIELD

Embodiments disclosed herein relate generally to managing operation of a data processing system. More particularly, embodiments disclosed herein relate to systems and methods to manage entitlement to use software by components of a data processing system.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
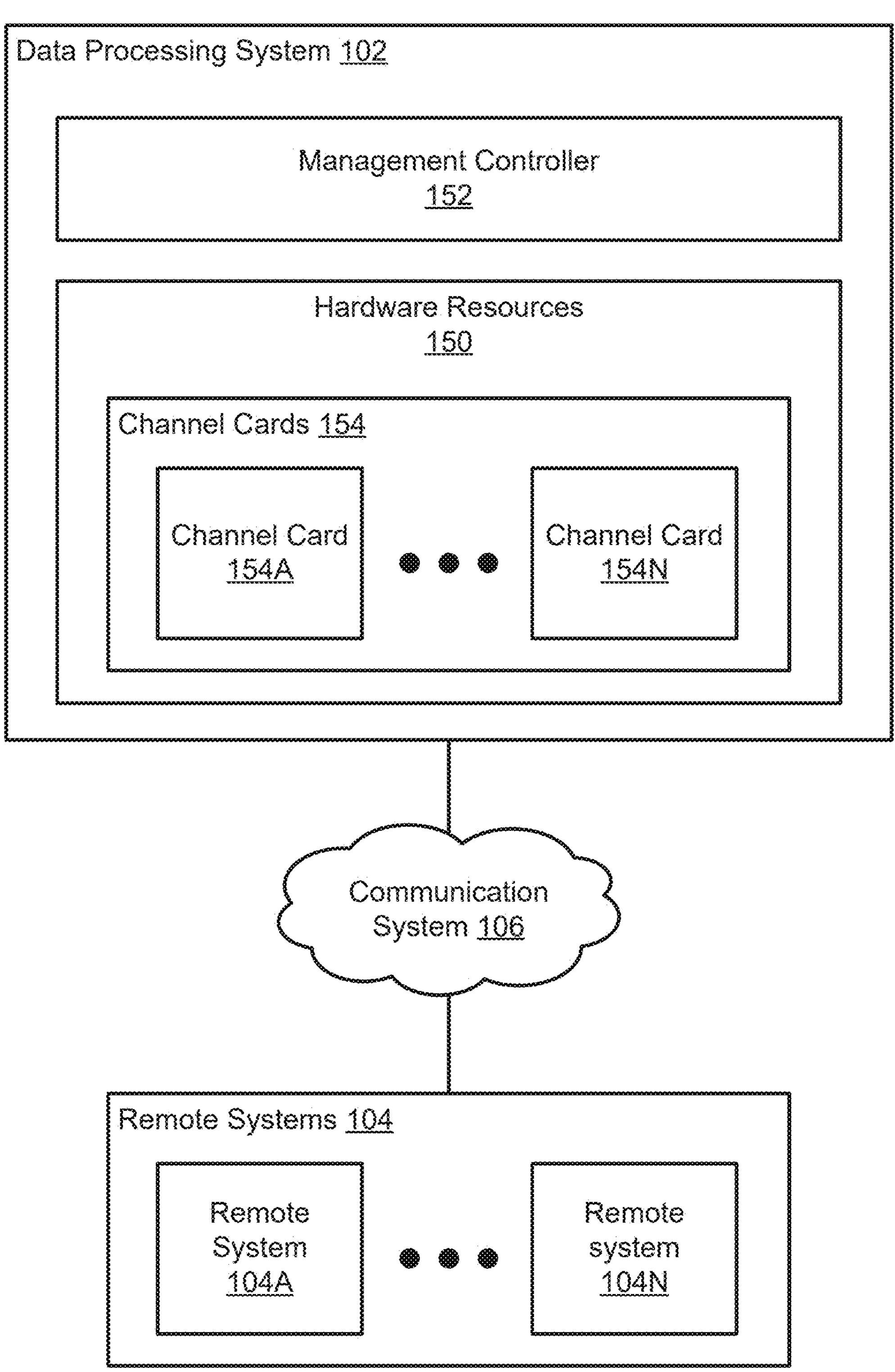
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operation of a data processing system. The data processing system may provide computer-implemented services. To provide the computer-implemented services, hardware resources of the data processing system such as memory, processors, channel cards, and/or other hardware components may operate in cooperation with one another. During cooperative operation, some hardware resources may attempt to access information stored by other hardware resources, may attempt to issue commands to the other hardware resources, and/or may otherwise attempt to activate functions of the other hardware resources.

For example, a processor of the data processing system may issue commands to a channel card of the data processing system in order to facilitate provision of the computer-implemented services. The channel card may include, for example, a graphics card, a sound card, a storage card, and/or other types of hardware components of the data processing system that may be added, removed and/or replaced. To invoke functionality of the channel card, the processor may issue commands recognized by the channel card. These commands may be defined by configuration settings of and/or software hosted by the hardware resources (firmware, drivers, etc.) that support the cooperative operation of the hardware resources.

Over time (e.g., after an end user obtains the data processing system from the manufacturer), hardware components of the data processing system may be modified. For example, a user may replace a stock channel card (e.g., a standard channel card) that was manufactured by the manufacturer of the data processing system with an aftermarket channel card (e.g., a non-standard channel card manufactured by an entity different to the manufacturer of the data processing system). The aftermarket channel card may be a configurable hardware component and may include different (e.g., additional) functionality from the stock channel card. For example, the aftermarket channel card may include standard functions (e.g., known functionality, based on a current or preceding industry standard with which the aftermarket channel card is compliant) and non-standard functions.

The non-standard functions may include functionality not known by the stock hardware components, and therefore may not be natively invokable using commands issued by the stock hardware components and/or software hosted thereon. For example, a command issued by the stock hardware resources that implicates use of a non-standard function of the aftermarket channel card may not be natively executable by the aftermarket channel card (e.g., the command may not include instructions for activating the non-standard function of the channel card).

In order to utilize the non-standard functions of a non-standard channel card, specialized software may be required (e.g., to convert commands issued by the stock hardware resources into commands which invoke a non-standard function). The software may be controlled by a remote third party, which may include a manufacturer of the non-standard channel card. However, the software required to utilize the non-standard functions may include proprietary information (e.g., proprietary logic, such as algorithms, code, concepts, etc.) that the third party may wish to protect and/or otherwise restrict access to (e.g., via the requirement of a license). Therefore, the non-standard channel card may be required to demonstrate entitlement to use of the proprietary software.

To demonstrate the entitlement, a management controller of the data processing system may provide a request to the non-standard channel card, the request challenging the channel card to demonstrate entitlement to use of the proprietary software. In response, the channel card may provide a signed data structure to the management controller, the signed data structure being signed with a private key of a public private key pair maintained by the channel card. The management controller may provide the signed data structure to the remote third party for verification (e.g., via out-of-band methods). If the remote third party verifies that the signed data structure is usable to establish the entitlement (e.g., by verifying that the data structure was signed using the private key using a public key of the public private key pair), the channel card may use the proprietary software in the provision of computer-implemented services.

Thus, embodiments disclosed herein may address, among other technical problems, the technical challenge of establishing entitlement to use proprietary software by a non-standard channel card. A management controller may be used to obtain a signed data structure from the non-standard channel card and provide the signed data structure to a remote system (e.g., which controls the proprietary software) via out-of-band methods. As a result, access to the proprietary software may be established without involvement of other hardware resources (e.g., in-band components) of the data processing system, which may reduce a likelihood of compromise of the data processing system. The non-standard functions of the non-standard channel card may then be invoked using the proprietary software, which may result in different types and/or an improvement in quality of the computer-implemented services provided.

In an embodiment, a method for managing operation of a data processing system is disclosed. The method may include: making an identification that a channel card of the data processing system is a non-standard channel card, the non-standard channel card being configured to perform at least one non-standard function; based on the identification: obtaining, by a management controller of the data processing system, a signed data structure indicating an entitlement for the channel card, the signed data structure including a signature usable to verify the channel card is entitled to use of proprietary software; performing, by the management controller and via at least an out-of-band interaction with a remote system, a verification process to determine whether the signed data structure is usable to establish the entitlement; and in an instance of the verification process in which the signed data structure is usable to establish the entitlement: providing, using the channel card and the proprietary software, computer-implemented services.

Obtaining the signed data structure may include: providing, by the management controller, a request to the channel card, the request challenging the channel card to demonstrate entitlement to use of the proprietary software; and obtaining, from the channel card, a response, the response including the signed data structure signed using a private key of a public private key pair maintained by the channel card.

Performing the verification process may include: sending, by the management controller, the signed data structure to the remote system via an out-of-band communication channel; and receiving, from the remote system and via the out-of-band communication channel, a response indicating whether the signed data structure is usable to establish the entitlement.

The entitlement may dictate a type of proprietary software that the channel card is entitled to use, and the type of proprietary software may dictate which non-standard functions of the channel card are allowed to be invoked by the data processing system.

Use of the proprietary software may be controlled exclusively by the remote system.

The remote system may be a system operated by a manufacturer of the channel card.

The management controller may be separate from and tasked with managing operation of hardware resources, the hardware resources including at least the channel card.

The obtaining may be performed via sideband channels of the data processing system.

The non-standard function of the channel card may be based on standard functions of a type of channel card, and the standard functions of the type of the channel card may be based on an industry standard with which the channel card is compliant.

The non-standard function may be a capability of the channel card that is additional to those of the industry standard, and may not be natively invokable by hardware resources and software hosted thereon.

The identification may be made by a basic input/output system (BIOS) of the data processing system during a startup procedure for the data processing system.

In an embodiment, a non-transitory media is provided that may include instructions that when executed by a processor cause the computer-implemented method to be performed.

In an embodiment, a data processing system is provided that may include the non-transitory media and a processor, and may perform the computer-implemented method when the computer instructions are executed by the processor.

Turning to FIG. 1A, a block diagram illustrating a system in accordance with an embodiment is shown. The system shown in FIG. 1A may provide computer-implemented services. The computer-implemented services may include any type and quantity of computer-implemented services. For example, the computer-implemented services may include data storage services, instant messaging services, database services, data generation services, and/or any other type of service that may be implemented with a computing device. The computer-implemented services may be provided, at least in part, using various components of hardware resources of the data processing system, such as channel cards (e.g., graphics cards, network interface cards (NICs), accelerator cards, expansion cards).

To provide the computer-implemented services, hardware components of the data processing system may interact with one another cooperatively. For example, the computer-implemented services may require cooperative interaction between processors, memory modules, storage devices, and/or the channel cards. Based on these interactions, the hardware components may support execution of any number and/or types of software components (e.g., applications hosted by the hardware components), and, in some combination, the hardware and software components may provide for various types of computer-implemented services.

The interactions between the hardware and/or software components may depend on the presence of appropriate firmware, drivers, configuration data, and/or configuration settings of the data processing system that support the cooperative interactions. For example, a channel card of the data processing system may require that specialized firmware be installed to the data processing system, and the specialized firmware may define commands that, when issued to the channel card, may activate a function of the channel card necessary for providing desired computer-implemented services. Thus, during setup (e.g., manufacturing) of the data processing systems, the appropriate firmware, drivers, configuration data, and/or configuration settings that define commands for invoking functionality of existing (e.g., standard, stock) hardware components of the data processing system may be installed.

Over time (e.g., after manufacturing or setup), hardware components such as channel cards may be modified (e.g., by an end user). For example, a stock channel card may be replaced with an aftermarket channel card, and/or aftermarket channel cards may be added to the data processing system. Functionality of the aftermarket channel cards may vary to a high degree depending on their manufacturer and/or due to the programmable nature of some channel cards (SmartNICs, data processing unit (DPU) cards, etc.).

For example, channel cards (e.g., non-standard channel cards) may include programmable platform devices capable of performing various functions in various different ways and/or some may require special methods of communication (e.g., specialized application programming interfaces (APIs)). In other words, some functionality of the channel cards may (i) not adhere to an industry standard for similar types of channel cards, (ii) may be in addition to the functionality specified by the industry standard, and/or (iii) may otherwise require specialized or unusual information to utilize such functions. These functions may be referred to as non-standard functions. Therefore, the host system (e.g., the stock hardware components and software hosted thereon, added by the manufacturer during manufacturing and that may only include capabilities to natively interact with industry standard functionalities) may be unable to natively invoke the non-standard functions of the channel cards without using proprietary software (e.g., third-party drivers and/or APIs for the channel cards).

For example, proprietary software for (non-standard) channel cards may be adapted to interpret and convert commands issued by hardware resources of the data processing system to obtain customized commands. The customized commands may be natively executable by the channel cards and may invoke the non-standard functions of the channel cards. However, when performing this functionality, the proprietary software may use confidential information such as concepts, ideas, algorithms, and/or other secrets, and therefore access to the proprietary software may be restricted (e.g., by the third party) to channel cards which are entitled to use the proprietary software. Thus, in order to use the proprietary software to provide the computer-implemented services, it may be necessary to demonstrate and/or otherwise prove entitlement to use the proprietary software.

In general, embodiments disclosed herein may provide methods, systems, and/or devices for managing operation of a data processing system in a manner that facilitates use of proprietary software for invoking non-standard functions of channel cards. To facilitate use of the proprietary software, a channel card may include an entitlement to use the proprietary software (e.g., an embedded license). When challenged, the channel card may demonstrate entitlement to use the proprietary software by signing a data structure using a private key of a public private key pair maintained by the channel card. In doing so, the entitlement may be cryptographically verified by the third-party owner of the proprietary software (e.g., a manufacturer of the channel cards) using a public key of the public private key pair, which may allow the proprietary software and the non-standard functions to be used in providing computer-implemented services.

To communicate with the third-party owner of the proprietary software, the data processing system may include out-of-band (hardware) components, such as a management controller. The management controller may be separate from and tasked with managing operation of hardware resources of the data processing system. To do so, the management controller may obtain a signed data structure from a channel card indicating an entitlement to use the proprietary software, and may provide the signed data structure to a remote system used by the third party.

If the third party verifies the entitlement of the channel card (e.g., using a public key of the public private key pair used to sign the data structure), the management controller may facilitate use of the proprietary software (e.g., hosting a licensed copy of the proprietary software, indirectly using the proprietary software via the remote system). By doing so, a system in accordance with an embodiment may provide computer-implemented services using non-standard functions of channel cards which utilize proprietary software. Because the proprietary software may never traverse the hardware resources of the data processing system (e.g., by using out-of-band components), there may be a reduced likelihood of compromise of the data processing system (e.g., if the proprietary software is malicious).

To provide the above-mentioned functionality, the system of FIG. 1A may include data processing system 102, remote systems 104, and communication system 106. Data processing system 102 may include hardware resources 150 and management controller 152. The system, any components thereof, and/or any other types of devices or components not shown in FIG. 1A may perform all, or a portion of the computer-implemented services independently and/or cooperatively. Each of these components is discussed below.

Data processing system 102 may include any number and/or type of data processing systems which may include any number and/or type of hardware components (e.g., hardware resources 150). The hardware components may support execution of any number and/or type of applications (e.g., software components). Changes in available functionalities of the hardware and/or software components may provide for various types of computer-implemented services to be provided.

Hardware resources 150 may include any number of hardware components (e.g., memory, processors, channel cards). For example, hardware resources 150 may include any number of channel cards 154 (e.g., 154A-154N). Channel cards 154 may include expansion cards and/or adapter cards that may add specific functions to data processing system 102. Each channel card of channel cards 154 may be designed to perform a specific task and/or provide additional capabilities to data processing system 102 (e.g., beyond what other hardware components such as a motherboard of data processing system 102 may offer). For example, channel cards 154 may include graphics processing units (GPUs), network interface cards (NICs), storage controller cards, wireless network cards, Universal Serial Bus (USB) expansion cards, and/or other types of cards.

Channel cards 154 may include any number of standard channel cards (e.g., installed by a manufacturer of data processing system 102) and/or non-standard channel cards (e.g., added by a user of data processing system 102) and, therefore, may include a heterogeneous set of channel cards. Channel cards 154 may function in cooperation with other components of hardware resources 150.

Hardware resources 150 may host applications and/or other software, and store and/or execute instructions provided by the applications and/or the software in order to facilitate provision of a computer-implemented service. For example, an operating system hosted by hardware resources 150 may manage interactions between channel cards 154 and other hardware components (e.g., processors, storage devices, memory modules, etc., not shown) of hardware resources 150. For example, a processor of data processing system 102 may interact with channel card 154A of data processing system 102 by issuing instructions (e.g., commands) to channel card 154A. Upon reading and/or executing a command, channel card 154A may perform a desired function in cooperation with the processor and/or other hardware components of hardware resources 150.

To support cooperative interactions between non-standard channel cards and other hardware components of hardware resources 150, management controller 152 may manage interactions between components of hardware resources 150. For example, management controller 152 may manage (e.g., screen) commands issued to any non-standard channel cards of channel cards 154 by a processor of hardware resources 150 using a service. To manage the interactions between the components of hardware resources 150, management controller 152 may establish connections with remote systems 104.

Remote systems 104 may include any number of systems (e.g., 104A-104N) remote to data processing system 102 and may be operated and/or managed by any number of entities. For example, remote systems 104 may include remote system 104A used by a manufacturer of channel cards different to a manufacturer of data processing system 102 (e.g., a third party). Remote system 104A may host proprietary software that uses proprietary logic to, for example, interpret and convert commands issued by hardware resources 150 of data processing system 102, in a manner that facilitates use of non-standard functions of any of channel cards 154.

For example, channel card 154A may include a non-standard channel card with non-standard functions not natively invokable by commands issued by hardware resources 150. Remote system 104A may host third-party software that is proprietary to a manufacturer of channel card 154A (e.g., proprietary software) and remote system 104A may provide a service (e.g., a Cloud service) for modifying commands issued by hardware resources 150 using the proprietary software. The modified commands may include customized commands recognized by channel card 154A that invoke the non-standard functions. The service (e.g., a third-party service provided by remote system 104A) may be accessed by data processing system 102 using out-of-band methods (e.g., by out-of-band components via out-of-band communication channels), which may be contingent on establishing entitlement to the proprietary software used to provide the service.

To establish services for invoking non-standard functions of a channel card, management controller 152 may (i) register itself (e.g., with respect to channel card 154A) with remote system 104A in order to access proprietary software offered by remote system 104A (e.g., hosted by remote system 104A and utilized via a Cloud service, hosted by management controller 152 and provided by remote system 104A), (ii) establish non-standard function entitlement (e.g., based on an embedded license hosted by channel card 154A) by providing a signed data structure to remote system 104A for verification, (iii) establish non-standard function preferences (e.g., based on user input) for the channel card for configuration of the licensed services (e.g., to limit use of one or more of the non-standard functions, to establish user preferences for the channel card configuration), and/or (iv) perform other actions.

For example, the proprietary software hosted by the third-party service may provide command processing services. To use the command processing services, commands managed by management controller 152 may be modified via interactions over the out-of-band communication channels established with the third-party service, and the third-party service may provide modified commands generated in accordance with the non-standard function preferences using the proprietary software. Refer to the discussion of FIG. 2A for additional details regarding obtaining access to the third-party services.

To manage command processing for the channel card, management controller 152 may (i) screen commands destined to the channel card to identify whether the commands implicate use of a non-standard function of the channel card, (ii) modify, using the proprietary software provided by remote system 104A, the commands to obtain non-standard function customized commands capable of invoking the desired non-standard functions, (iii) provide the non-standard function customized commands to the channel card for execution by the channel card, and/or (iv) perform other operations for managing operation of data processing system 102 and/or components thereof. Refer to the discussion of FIG. 2B for additional details regarding command processing using a remote system.

To modify the commands using the proprietary software provided by remote system 104A, management controller 152 may (i) send, via the out-of-band communication channel, the commands to remote system 104A and (ii) receive, via the out-of-band communication channel and from remote system 104A, the non-standard function customized commands, (iii) receive, via the out-of-band channel a licensed copy of the proprietary software to be hosted by management controller 152, and/or (iv) perform other tasks. By obtaining access to the third-party proprietary software, the non-standard function customized commands may be obtained, which may allow the non-standard functions of the channel cards to be utilized to provide computer-implemented services.

In some cases, data processing systems may restrict functionality of non-standard channel cards due to (i) a lack of trust, (ii) a high consumption of computing resources used to invoke the non-standard functions, and/or (iii) other reasons. The restriction of functionality may therefore limit the ability of the channel card to provide functionality to a data processing system (e.g., data processing system 102). To increase a likelihood of providing the desired computer-implemented services, management controller 152 may facilitate conversion of non-standard channel cards to standard channel cards. For example, upon addition of channel card 154A to data processing system 102, management controller 152 may (i) obtain a notification (e.g., from a startup management entity such as a BIOS) that channel card 154A has been operably connected to data processing system 102, (ii) identify that channel card 154A is a non-standard channel card, and/or (iii) based on the identification, obtain user input indicating whether the non-standard channel card is to be converted to a standard channel card.

If the user input indicates that the non-standard channel card is to be converted to the standard channel card, management controller 152 may exchange data with a remote system which controls access to the standard functions of the standard channel card (e.g., remote system 104B). Remote system 104B may be managed by a manufacturer/vendor of data processing system 102. Remote system 104B may interact with management controller 152 to verify that the user of data processing system 102 is authorized to use firmware for a standard channel card (e.g., the user has an active license for the firmware).

To do so, management controller 152 may (i) obtain, via an out-of-band communication channel, a certificate for the standard channel card from remote system 104B, and/or (ii) perform, cooperatively with at least a portion of hardware resources 150 and using the certificate, an action set to convert the non-standard channel card to the standard channel card to obtain a converted channel card.

The certificate may be a cryptographically verifiable data structure indicating that the user has a right to use firmware associated with the standard channel card and performing the action set may include at least (i) deleting firmware installed on the channel card, (ii) installing the firmware associated with the standard channel card, and/or (iii) generating a new public private key pair usable to verify the converted channel card is licensed and/or otherwise entitled to access the firmware associated with the standard channel card. The new public private key pair may replace and/or supersede the public private key pair used to demonstrate entitlement to use the proprietary software and/or the non-standard functions (e.g., a first public private key pair). A private key of the new public private key pair may be kept secret by the converted channel card and a public key of the new public private key pair may be made available to management controller 152, remote system 104B, and/or other entities for use in verifying signatures generating using at least the private key of the new public private key pair. By doing so, standard functions for the type of the channel card may be available to the user and the non-standard functions may no longer be available. Refer to the discussion of FIG. 2C for additional details regarding channel card conversion.

Management controller 152 may be distinct from and/or may operate independently from hardware resources 150. To facilitate cooperation between hardware resources 150 and management controller 152, hardware resources 150 may host an agent for management controller 152 (not shown). The agent (e.g., a software program) may facilitate communication between management controller 152 and hardware resources 150. Refer to the discussion of FIG. 1B for more information regarding the functionality of management controller 152.

Figure 2A:
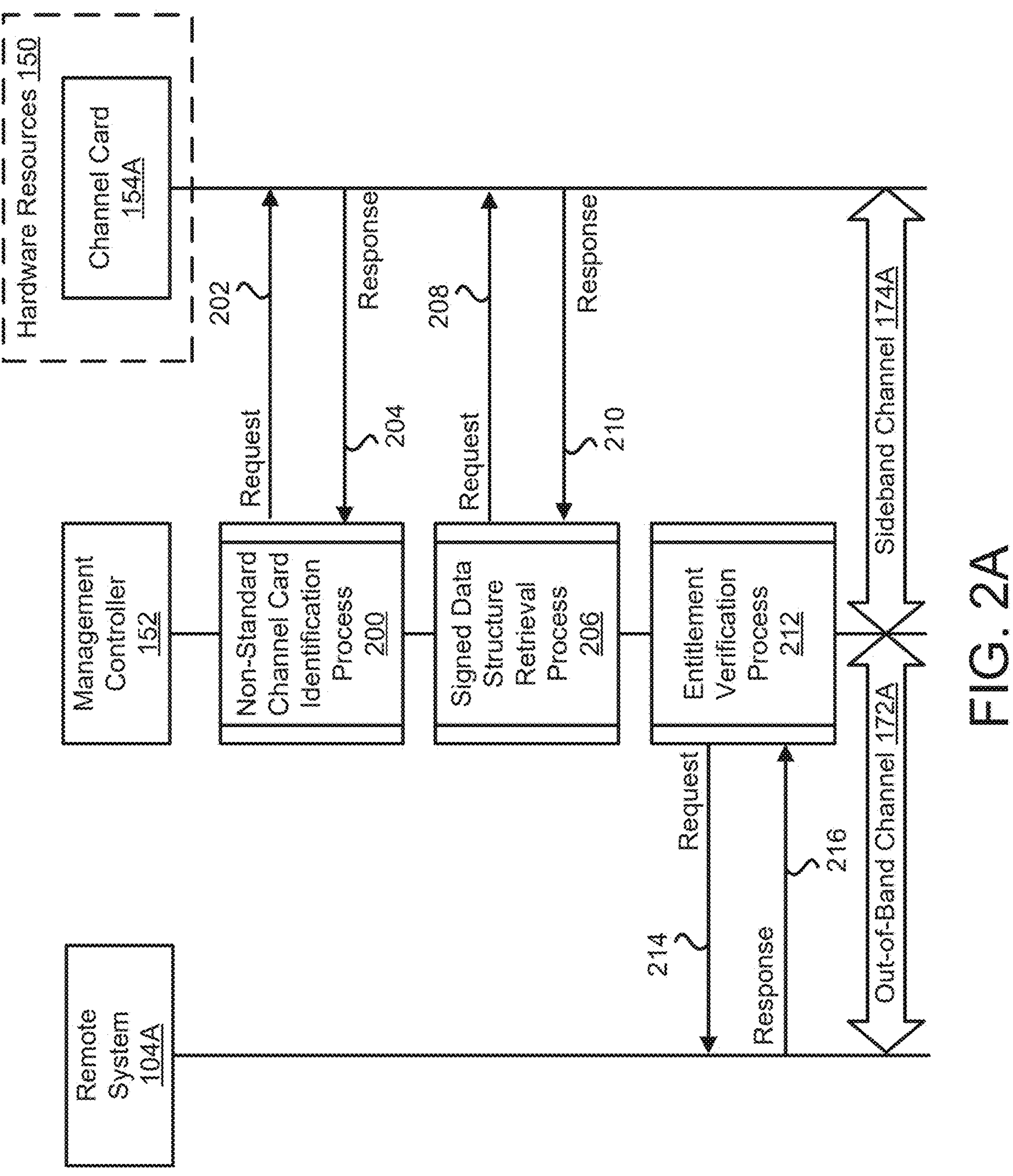
FIGS. 2A-2C show interaction diagrams in accordance with an embodiment.
Figure 2B:
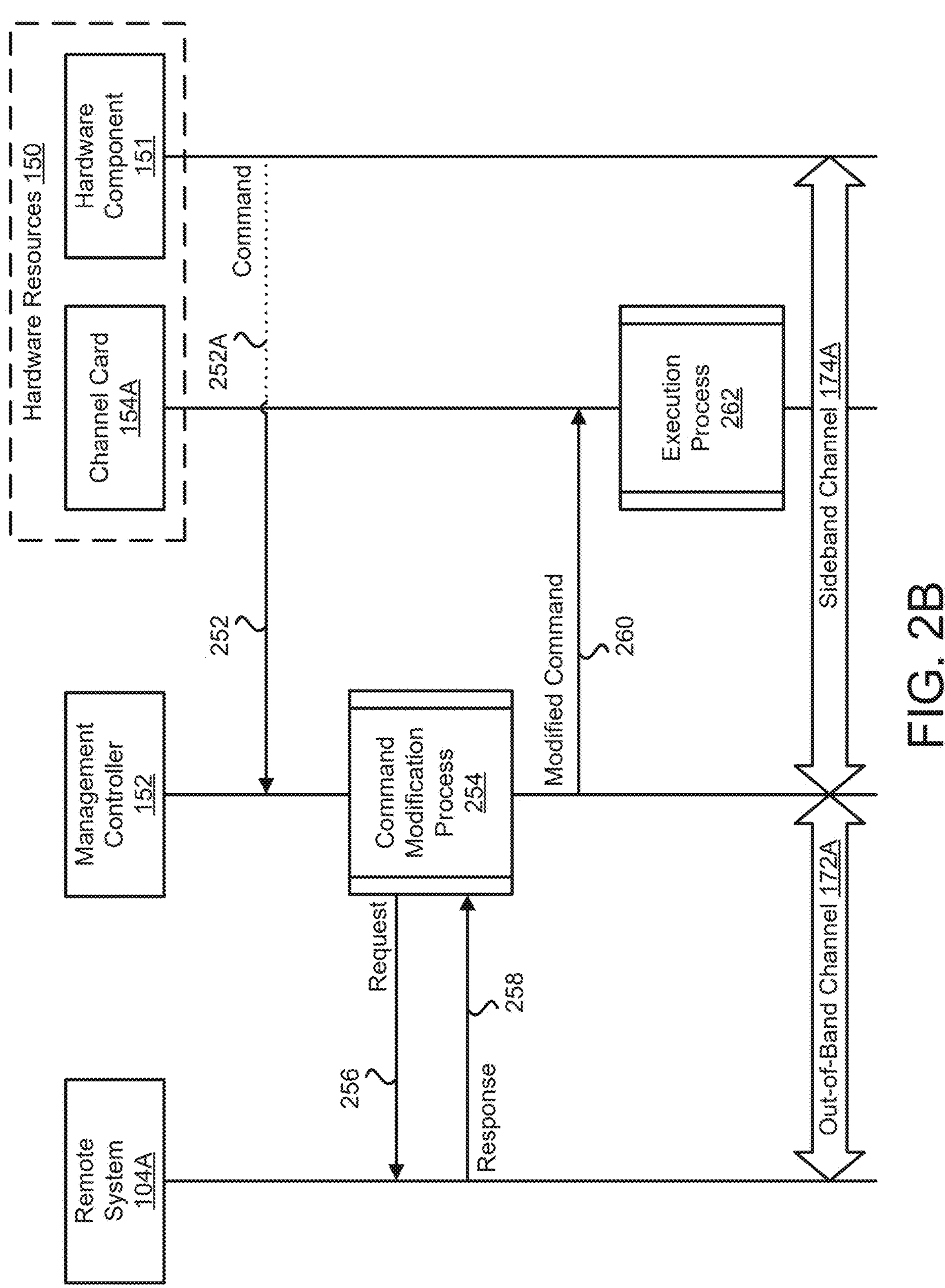
Figure 2C:
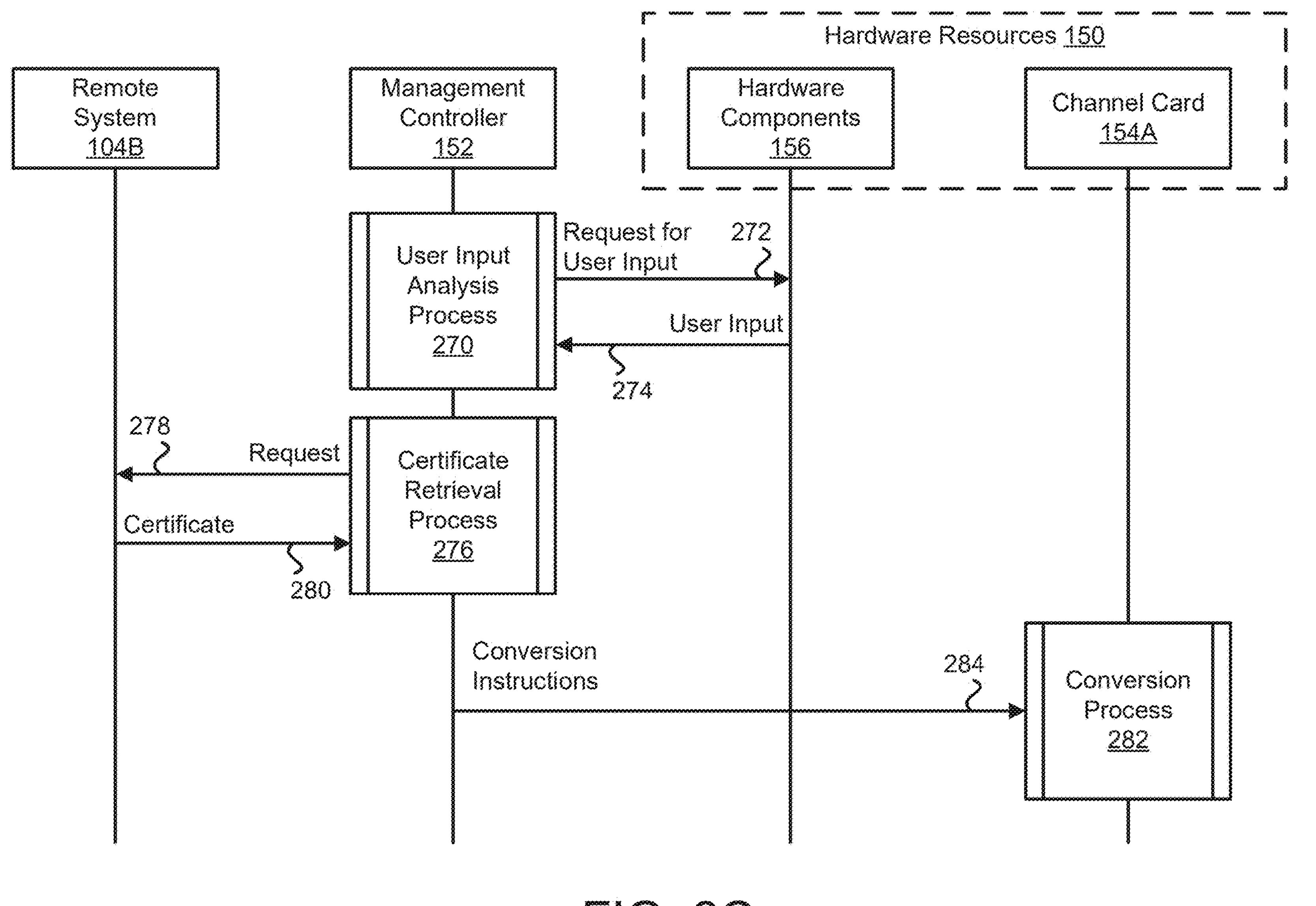
Figure 3:
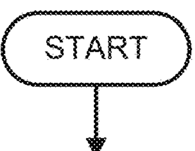
FIG. 3 shows a flow diagram illustrating a method of managing a data processing system in accordance with an embodiment.

When providing their functionality, any of data processing system 102, remote systems 104, and/or components thereof may perform all, or a portion of the actions and methods illustrated in FIGS. 2A-3.

Any of (and/or components thereof) data processing system 102 and/or remote systems 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., smartphone), an embedded system, local controllers, an edge node, and/or any other type of data processing device or system. For additional details regarding computing devices, refer to the discussion of FIG. 4.

Any of the components illustrated in FIG. 1A may be operably connected to each other (and/or components not illustrated) with communication system 106. Communication system 106 may facilitate communications between the components of FIG. 1A. In an embodiment, communication system 106 includes one or more networks that facilitate communication between any number of components. The networks may include wired networks and/or wireless networks (e.g., and/or the Internet). The networks and communication devices may operate in accordance with any number and types of communication protocols (e.g., such as the Internet protocol).

While illustrated in FIG. 1A as including a limited number of specific components, a system in accordance with an embodiment may include fewer, additional, and/or different components than those illustrated therein.

Figure 1B:
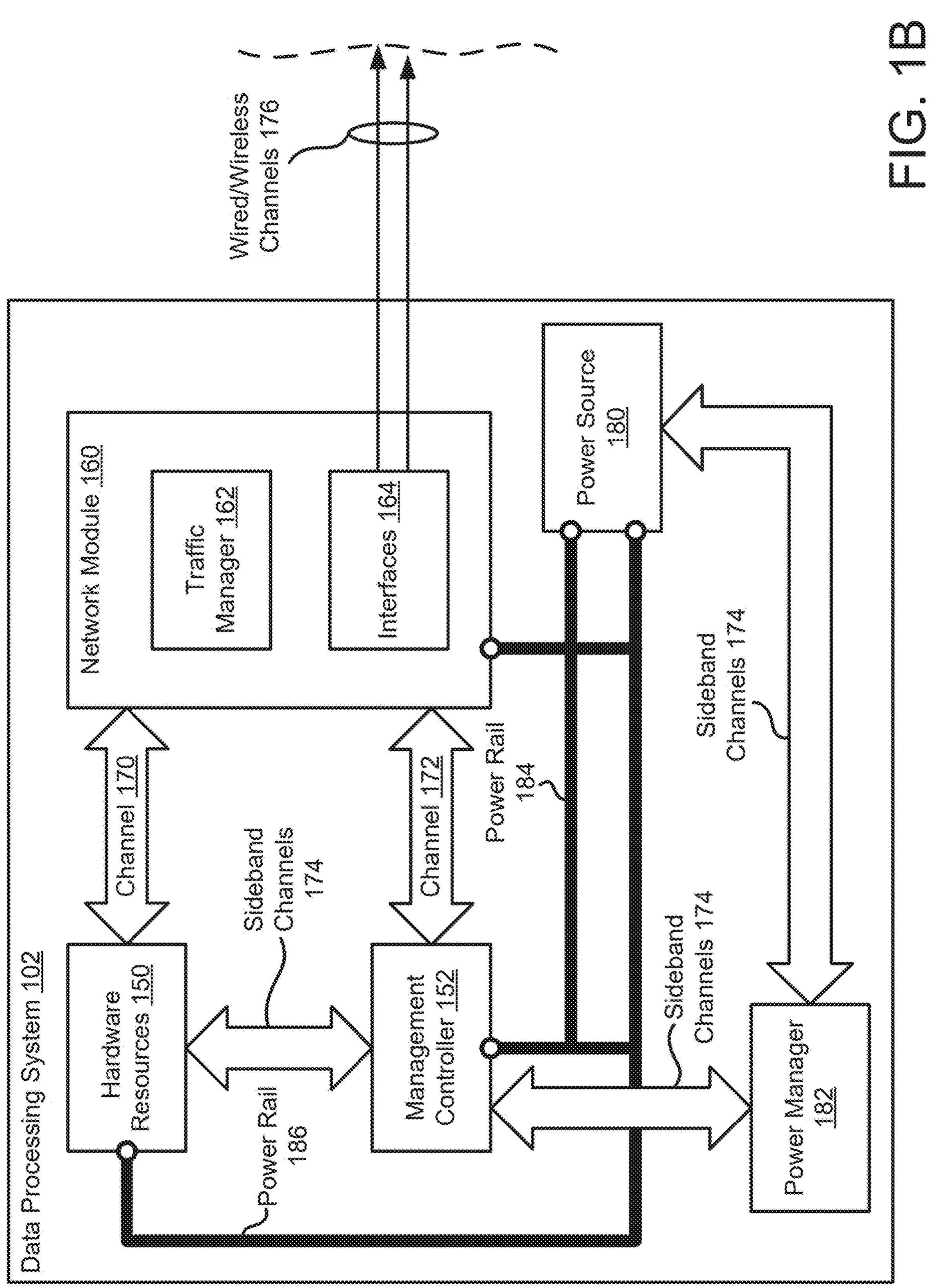
FIG. 1B shows a block diagram illustrating components of a data processing system in accordance with an embodiment.

Turning to FIG. 1B, a diagram illustrating components of a data processing system in accordance with an embodiment is shown. The components of the data processing system shown in FIG. 1B may be similar to those of data processing system 102 of in FIG. 1A.

To provide computer-implemented services, data processing system 102 may include any quantity of hardware resources 150. Hardware resources 150 may be in-band hardware components, and may include a processor operably coupled to memory, storage, channel cards, and/or other hardware components.

The processor may host various management entities such as operating systems, drivers, network stacks, and/or other software entities that provide various management functionalities. For example, the operating system and drivers may provide abstracted access to various hardware resources. Likewise, the network stack may facilitate packaging, transmission, routing, and/or other functions with respect to exchanging data with other devices.

For example, the network stack may support transmission control protocol/internet protocol communication (TCP/IP) (e.g., the Internet protocol suite) thereby allowing the hardware resources 150 to communicate with other devices via packet switched networks and/or other types of communication networks.

The processor may also host various applications that provide the computer-implemented services. The applications may utilize various services provided by the management entities and use (at least indirectly) the network stack to communicate with other entities.

However, use of the network stack and the services provided by the management entities may place the applications at risk of indirect compromise. For example, if any of these entities trusted by the applications are compromised, these entities may subsequently compromise the operation of the applications. For example, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 102) to another device via any number of intermediate networks (e.g., via wired/wireless channels 176 that are part of the networks).

To reduce the likelihood of the applications and/or other in-band entities from being indirectly compromised, data processing system 102 may include management controller 152 and network module 160. Each of these components of data processing system 102 is discussed below.

Management controller 152 may be implemented, for example, using a system on a chip or other type of independently operating computing device (e.g., independent from the in-band components, such as hardware resources 150, of a host data processing system 102). For example, management controller 152 may host proprietary software (e.g., third-party software for a non-standard channel card of data processing system 102) separately from hardware resources 150 in order to avoid indirect compromise of software and/or network stacks hosted by hardware resources 150 by potentially malicious proprietary software. Management controller 152 may provide various management functionalities for data processing system 102. For example, management controller 152 may monitor various ongoing processes performed by the in-band components, may manage power distribution, may participate in thermal management, and/or other may perform other functions, such as communicating with remote systems in order to obtain access to proprietary software and/or facilitating use of the proprietary software by hardware components of the data processing system (e.g., identifying and/or intercepting commands sent between the in-band components).

To do so, management controller 152 may be operably connected to various components via sideband channels 174 (in FIG. 1B, a limited number of sideband channels are included for illustrative purposes, it will be appreciated that management controller 152 may communicate with other components via any number of sideband channels such as 174A shown in FIG. 2A). The sideband channels may be implemented using separate physical channels, and/or with a logical channel overlay over existing physical channels (e.g., logical division of in-band channels). The sideband channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, sideband channels 174 may facilitate communications between management controller 152 and a channel card of hardware resources 150 (e.g., channel card 154A) so that management controller 152 may obtain a signed data structure from channel card 154A (e.g., usable to verify channel card 154A is entitled to use proprietary software from a remote system). Sideband channels 174 may also be used by management controller 152 to identify and/or intercept commands issued by a processor of hardware resources 150 destined for a channel card of hardware resources 150. In addition, when management controller 152 obtains modified commands (e.g., from a remote system that provides command modification services, such as remote system 104), management controller 152 may use sideband channels 174 to provide the modified commands to the channel card (and/or another hardware component of hardware resources 150).

To reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152. Management controller 152 may then, for example, send the information via sideband channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similarly, processes may be used to facilitate outbound communications from the applications.

Management controller 152 may be operably connected to communication components of data processing system 102 via separate channels (e.g., 172, 172A shown in FIG. 2A) from the in-band components, and may implement or otherwise utilize a distinct and independent network stack (e.g., TCP/IP). Consequently, management controller 152 may communicate with other devices independently of any portion of the in-band components (e.g., does not rely on any hosted software, hardware components, etc.). Accordingly, compromise of any of hardware resources 150 and hosted component may not result in indirect compromise of any management controller 152, and entities hosted by management controller 152.

To facilitate communication with other devices, data processing system 102 may include network module 160. Network module 160 may provide communication services for in-band components and out-of-band components (e.g., management controller 152) of data processing system. To do so, network module 160 may include traffic manager 162 and interfaces 164.

Traffic manager 162 may include functionality to (i) discriminate traffic directed to various network endpoints advertised by data processing system 102, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components. For example, when establishing entitlement to use proprietary software and/or using the proprietary software to perform command modification, management controller 152 may communicate with a remote system (e.g., 104A) via out-of-band communication channels (e.g., channel 172) independently from and/or without traversing a network stack of hardware resources 150. By doing so, management controller 152 may request, obtain, and/or provide modified commands transparently to the host system (e.g., hardware resources 150).

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a Wi-Fi card, a wireless local area network card, a wired local area network card, an optical communication card, and/or other types of communication components. These components may support any number of wired/wireless channels 176.

Thus, from the perspective of an external device, the in-band components and the out-of-band components of data processing system 102 may appear to be two independent network entities that may independently addressable and otherwise unrelated to one another.

To facilitate management of data processing system 102 over time, hardware resources 150, management controller 152 and/or network module 160 may be positioned in separately controllable power domains. By being positioned in these separately power domains, different subsets of these components may remain powered while other subsets are unpowered.

For example, management controller 152 and network module 160 may remain powered while hardware resources 150 is unpowered. Consequently, management controller 152 may remain able to communication with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons.

To implement the separate power domains, data processing system 102 may include a power source (e.g., 180) that separately supplies power to power rails (e.g., power rail 184, power rail 186) that power the respective power domains. Power from the power source (e.g., a power supply, battery, etc.) may be selectively provided to the separate power rails to selectively power the different power domains. A power manager (e.g., 182) may manage power from power source 180, and power may be supplied via the power rails. Management controller 152 may cooperate with power manager 182 to manage supply of power to these power domains. Management controller 152 may communicate with power manager 182 via sideband channels 174 and/or via other means.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

While illustrated in FIG. 1B with a limited number of specific components, a system may include additional, fewer, and/or different components without departing from embodiments disclosed herein.

To further clarify embodiments disclosed herein, interaction diagrams in accordance with an embodiment are shown in FIGS. 2A-2C. The interaction diagrams may illustrate examples of how data may be obtained and used within the systems of FIGS. 1A-1B. In the examples shown in FIGS. 2A-2C, a data processing system (e.g., 102) may include components such as hardware resources 150 and management controller 152. Hardware resources 150 may include channel card 154A. The components of the data processing system may be similar to and/or include functionality similar to those described with respect to FIGS. 1A-1B.

In the interaction diagrams, processes performed by and interactions between components of a system in accordance with an embodiment are shown. In the diagrams, components of the system are illustrated using a first set of shapes (e.g., 152, 154A, etc.), located towards the top of each figure. Lines descend from these shapes. Processes performed by the components of the system are illustrated using a second set of shapes (e.g., 200, 206, etc.) superimposed over these lines.

Interactions (e.g., communication, data transmissions, etc.) between the components of the system are illustrated using a third set of shapes (e.g., 202, 204, etc.) that extend between the lines. The third set of shapes may include lines terminating in one or two arrows. Lines terminating in a single arrow may indicate that one-way interactions (e.g., data transmission from a first component to a second component) occur, while lines terminating in two arrows may indicate that multi-way interactions (e.g., data transmission between two components) occur. Lines drawn in dashing (e.g., 252A) may indicate that the corresponding interactions are optional and/or may not occur during operation of the system for various reasons.

Generally, the processes and interactions are temporally ordered in an example order, with time increasing from the top to the bottom of each page. For example, the interaction labeled as 202 may occur prior to the interaction labeled as 204. However, it will be appreciated that the processes and interactions may be performed in different orders, any may be omitted, and other processes or interactions may be performed without departing from embodiments disclosed herein.

Turning to FIG. 2A, a first interaction diagram in accordance with an embodiment is shown. The first interaction diagram may illustrate processes and interactions that may occur when managing use of non-standard functions of hardware components of a data processing system. For example, managing use of the non-standard functions may include establishing entitlement for a channel card (e.g., channel card 154A) to use proprietary software (e.g., controlled by remote system 104A).

In order to manage use of the non-standard functions of hardware components of the data processing system (e.g., channel cards), management controller 152 may detect the presence of a channel card (e.g., channel card 154A) and may identify that channel card 154A is a non-standard channel card by performing non-standard channel card identification process 200. Non-standard channel card identification process 200 may include at least interactions 202 and 204. Non-standard channel card identification process 200 may be initiated by management controller 152 based on information obtained during startup of the data processing system. For example, during startup of the data processing system, a startup management entity (e.g., a BIOS) of the data processing system may identify that a new hardware component is present in the system (e.g., during a secured component verification process). The startup management entity may provide a notification to management controller 152 regarding the identification. The identification of the new hardware component (e.g., channel card 154A) may prompt management controller 152 to perform non-standard channel card identification process 200.

During non-standard channel card identification process 200, management controller 152 may request and/or obtain information from channel card 154A. Channel card 154A may include a non-standard channel card, which may include capabilities to perform standard functions of the type of the channel card (e.g., based on an industry standard with which the channel card is compliant) and at least one non-standard function (e.g., additional to those of the industry standard). For example, channel card 154A may be installed to the data processing system after its time of manufacturing and/or after a recent setup of the data processing system; therefore, other hardware components of hardware resources 150 may not include appropriate firmware, drivers, and/or other software necessary to utilize at least a portion of functions offered by the channel card 154A (e.g., the non-standard functions may not be natively invokable by hardware resources and/or software hosted by the data processing system).

To identify functions offered by channel card 154A, management controller 152 may provide a request for information to channel card 154A at interaction 202 via a sideband channel (e.g., sideband channel 174A). Management controller 152 may provide the request by (i) transmission via a message, (ii) storing in a storage with subsequent retrieval by channel card 154A, (iii) a publish-subscribe system where channel card 154A subscribes to updates from management controller 152 thereby causing a copy of the request to be propagated to channel card 154A, and/or (iv) other processes. The request may be provided, for example, via sideband channels 174. By providing the request to channel card 154A, channel card 154A may provide information usable for identifying non-standard functions of channel card 154A.

Channel card 154A may include hardware components such as memory, processors, etc., and may include a discovery protocol. For example, the information requested from channel card 154A may include, for example, (i) identifying information of channel card 154A (e.g., a model number, a card type, a manufacturer of channel card 154A), (ii) functions of channel card 154A (e.g., functionalities channel card 154A is capable of performing), (iii) interface elements of channel card 154A, and/or (iv) other information regarding channel card 154A. Channel card 154A may read the request and obtain a response to the request.

For example, if channel card 154A supports discovery by management controller 152, then the response may include a list of functions supported by channel card 154A. Otherwise, for example, if channel card 154A does not support discovery by management controller 152, the response may include identifying information for channel card 154A.

At interaction 204, the response may be provided to management controller 152 by channel card 154A (e.g. via sideband channel 174A) by (i) transmission via a message, (ii) storing in a storage with subsequent retrieval by management controller 152, (iii) a publish-subscribe system where management controller 152 subscribes to updates from channel card 154A thereby causing a copy of the response to be propagated to management controller 152, and/or (iv) other processes. Upon obtaining the response, management controller 152 may continue performance of non-standard channel card identification process 200.

Management controller 152 may read the response to identify non-standard functions for channel card 154A. To do so, management controller 152 may identify a type of channel card 154A (e.g., a type of channel cards such as a graphics card) and/or a list of functions of channel card 154A. This information may be included in the response, and/or may be obtained from a remote system or device (e.g., a managing entity of channel card 154A, such as a manufacturer's system which may include remote system 104A) based on other identifying information for channel card 154A included in the response. For example, management controller 152 may use out-of-band communication channels to communicate with remote system 104A to obtain a card type and/or a list of functions of channel card 154A (not shown).

During non-standard channel card identification process 200, management controller 152 may use the list of functions and the card type to identify the non-standard functions of channel card 154A. For example, management controller 152 may compare the list of functions with a list of industry standard functions for the card type. The non-standard functions may include capabilities of channel card 154A that are additional to those of the industry standard (e.g., that are not found on the list of industry standard functions for the card type), and the non-standard functions may not be natively invokable by hardware resources 150 (e.g., using software hosted by hardware resources 150).

For example, hardware resources 150 may include a processor, and channel card 154A may include a performance sound card. Prior to a user installing the performance sound card to the data processing system, the data processing system may have been configured to use an integrated sound card for audio transmission. The integrated sound card may include standard functions such as generating and recording audio; therefore, the processor may be configured to issue commands for generating and/or recording audio. However, the performance sound card may include non-standard functions in addition to the standard functions, such as data caching and/or data processing, and the processor may not be configured to issue such commands.

Making non-standard functions of channel card 154A available to a user of the data processing system may include obtaining access to proprietary software. The proprietary software may be controlled exclusively by a remote system and/or device (e.g., remote system 104A), which may include a system operated by a manufacturer of channel card 154A. The proprietary software may be usable to facilitate functionality of channel card 154A. For example, the proprietary software may be used to modify commands for channel card 154A to obtain non-standard function customized commands usable to invoke the non-standard functions. Refer to the description of FIG. 2B for additional details regarding command modification.

However, the proprietary software controlled by remote system 104A may use confidential information such as concepts, ideas, algorithms, and/or other secrets, and therefore access to the proprietary software may be restricted (e.g., by remote system 104A) to channel cards which are entitled to use the proprietary software (e.g., licensed channel cards). Thus, in order to use the proprietary software to provide the computer-implemented services, the channel cards may demonstrate and/or otherwise prove entitlement to use of the proprietary software.

To demonstrate entitlement to use of the proprietary software, signed data structure retrieval process 206 may be performed. Signed data structure retrieval process 206 may include at least interactions 208 and 210. During signed data structure retrieval process 206, management controller 152 may obtain a signed data structure indicating an entitlement to use of the proprietary software. The entitlement may dictate a type of proprietary software that channel card 154A is entitled to use and the type of proprietary software may dictate which non-standard functions of channel card 154A are allowed to be invoked by the data processing system. For example, channel card 154A may only be licensed (e.g., entitled) to access to a portion of the non-standard functions the channel card is capable of performing, and thus, may only be entitled to a type of the proprietary software usable to invoke the licensed portion of the non-standard functions.

To obtain the signed data structure usable to establish entitlement to use of the proprietary software, management controller 152 may provide a request to channel card 154A at interaction 208 (e.g., via sideband channel 174A). The request may include a challenge to channel card 154A to demonstrate entitlement to use of the proprietary software. The request may be provided by (i) transmission via a message, (ii) storing in a storage with subsequent retrieval by channel card 154A, (iii) a publish-subscribe system where channel card 154A subscribes to updates from management controller 152 thereby causing a copy of the request to be propagated to channel card 154A, and/or (iv) other processes.

Channel card 154A may read the request and obtain a response to the request. The response may include a signed data structure, the signed data structure including a signature usable to verify channel card 154A is entitled to use of the proprietary software. The signed data structure may be signed using a private key of a first public private key pair maintained by channel card 154A. For example, during manufacturing of channel card 154A, the manufacturer of channel card 154A may determine channel card 154A is entitled to use proprietary software controlled by the manufacturer (e.g., remote system 104A). The manufacturer may prompt channel card 154A to generate a first public private key pair, the private key of which may be stored in local storage of channel card 154A and may be kept secret by channel card 154A. The corresponding public key of the first public private key pair may be provided to the manufacturer for storage in a trusted key database, and usable to identify signatures generated using the private key of channel card 154A. Therefore, by signing data structures using the private key, channel card 154A may demonstrate entitlement and obtain access to the proprietary software.

At interaction 210, channel card 154A may provide the response to management controller 152 (e.g., via sideband channel 174A) by (i) transmission via a message, (ii) storing in a storage with subsequent retrieval by management controller 152, (iii) a publish-subscribe system where management controller 152 subscribes to updates from channel card 154A thereby causing a copy of the response to be propagated to management controller 152, and/or (iv) other processes.

Upon obtaining the response, management controller 152 may perform entitlement verification process 212. Entitlement verification process 212 may include at least interactions 214 and 216, which may include at least an out-of-band interaction with remote system 104A. Entitlement verification process 212 may include a verification process to determine whether the signed data structure is usable to establish the entitlement to use the proprietary software controlled by remote system 104A.

During entitlement verification process 212, a request may be provided to remote system 104A (e.g., via out-of-band channel 172A). The request may include (i) the signed data structure obtained from channel card 154A, (ii) information regarding the type of proprietary software required to invoke the desired non-standard functions of channel card 154A, (iii) a request for verification that channel card 154A is entitled to use the proprietary software, (iv) a request for a licensed copy of the proprietary software and/or any other software necessary to facilitate use of the proprietary software, and/or (v) other information.

Remote system 104 may read the request and obtain a response to the request, the response including the requested information (e.g., an indication regarding whether the signed data structure is usable to establish the entitlement, a licensed copy of the proprietary software, additional software). The response may be provided to management controller 152 at interaction 216 (e.g., via out-of-band channel 172A) by (i) transmission via a message, (ii) storing in a storage with subsequent retrieval by management controller 152, (iii) a publish-subscribe system where management controller 152 subscribes to updates from remote system 104A thereby causing a copy of the response to be propagated to management controller 152, and/or (iv) other processes.

In a first example, a licensed copy of the proprietary software usable to modify commands to invoke the non-standard functions of channel card 154A may be provided by remote system 104A to management controller 152 in the response. The licensed copy of the proprietary software may then be hosted locally on management controller 152.

In a second example, the proprietary software may be hosted by remote system 104A, and management controller 152 may provide commands to remote system 104A via out-of-band communication channels and receive modified commands in response. In that case, management controller 152 may be required to host additional software necessary to facilitate use of the proprietary software. The additional software may include flow control software that may be installed locally on management controller 152 to track and order (e.g., reorder) commands received from remote system 104A before issuing (e.g., forwarding) the commands to channel card 154A.

In a third example, remote system 104 may host the proprietary software and management controller 152 may not require additional software for facilitating the services provided by remote system 104A.

As a part of entitlement verification process 212, management controller 152 may read the response to determine whether the response indicates the signed data structure is usable to establish the entitlement. If management controller 152 determines the response indicates the signed data structure is usable to establish the entitlement, the proprietary software and the non-standard functions of channel card 154A may be used in the provision of computer-implemented services. Refer to the discussion of FIG. 2B for an example of how the proprietary software may be implemented.

Thus, the processes and interactions shown in FIG. 2A may be used to establish an entitlement for a channel card to use proprietary software controlled by a remote system. The entitlement may be established by obtaining a signed data structure from the channel card, which may include a signature usable to verify the channel card is entitled to use of the proprietary software. The signed data structure may be verified by the remote system and may allow use of the proprietary software by the channel card.

Turning to FIG. 2B, a second interaction diagram in accordance with an embodiment is shown. The second interaction diagram may illustrate flows of data and processing of data that may occur when invoking non-standard functions of hardware components of the data processing system (e.g., channel cards) using proprietary software hosted by a remote system. The processes and/or interactions described in FIG. 2B may occur after the remote system verifies a channel card is entitled to use the proprietary software.

To determine whether non-standard functions of channel card 154A should be invoked, management controller 152 may obtain (e.g., intercept) a command issued to channel card 154A from hardware component 151 of hardware resources 150 of the data processing system. For example, hardware component 151 may include a processor attempting to invoke a function of channel card 154A via the command.

At interaction 252A, the command may be issued to channel card 154A by hardware component 151 by transmission via a message and/or by other methods. However, management controller 152 may monitor activity of hardware resources 150 (e.g., hardware component 151) and may include functionality for identifying and/or intercepting commands issued to channel card 154A and/or other hardware components of hardware resources 150. For example, management controller 152 may identify and/or intercept the commands transparently (e.g., surreptitiously) to the processor and/or other hardware components of hardware resources 150 via sideband channel 174A.

Thus, at interaction 252, the command may be intercepted by management controller 152 using methods discussed above. Obtaining (e.g., intercepting) the command by management controller 152 may include preventing channel card 154A from receiving the command for at least a period of time, as indicated by the dashed arrow of interaction 252A.

The command issued to channel card 154A by hardware component 151 may not be natively executable by channel card 154A. For example, the command may include instructions for invoking standard functions of channel card 154A, but may not include instructions for invoking non-standard functions of channel card 154A. Non-standard functions of a channel card may include capabilities of the channel card that are additional to those of a standard (e.g., an industry standard) for a type of channel card (e.g., a type of card, such as a sound card, a graphics card, a network card). To determine whether non-standard functions of channel card 154A should be invoked, management controller 152 may perform command modification process 254.

During command modification process 254, management controller 152 may screen the command to determine whether the command implicates use of a non-standard function of channel card 154A. To screen the command, management controller 152 may (i) identify a card type of channel card 154A, and (ii) compare the command to a set of types of commands that are compliant with the standard for the card type (e.g., an industry standard). For example, if the command is a member of the set of types of commands that are compliant with the standard, then management controller 152 may conclude that the command may not implicate use of any non-standard functions of channel card 154A. Otherwise, management controller 152 may conclude that the command implicates use of a (e.g., at least one) non-standard function of channel card 154A.

If the command does not implicate use of any non-standard functions of channel card 154A, then management controller 152 may be adapted to allow processing of the command by channel card 154A without modification (e.g., management controller 152 may make the command available to channel card 154A). For example, management controller 152 may provide the command to channel card 154A (e.g., at an interaction communicated via sideband channel 174A, not shown) by (i) transmission via a message, (ii) storing in a storage with subsequent retrieval by channel card 154A, (iii) a publish-subscribe system where channel card 154A subscribes to updates from management controller 152 thereby causing a copy of the response to be propagated to channel card 154A, and/or (iv) other processes.

If the command implicates use of a non-standard function of channel card 154A, then management controller 152 may communicate with remote system 104A in order to modify the command using the proprietary software. To do so, during command modification process 254, management controller 152 may request services (e.g., command modification services) from remote system 104A. To request the services, management controller 152 may obtain (e.g., generate) a request. The request may include the command and/or other information (e.g., identifying information, cryptographic information, etc.).

At interaction 256, the request may be provided to remote system 104A using methods similar to those described with respect to interaction 214 of FIG. 2A (e.g., via out-of-band channel 172A). Remote system 104A may be operated by an entity different to an operator of the data processing system (e.g., management controller 152, hardware resources 150). For example, remote system 104A may be operated and/or managed by a manufacturer of channel card 154A and/or may host proprietary software of the manufacturer usable to interpret and convert commands for channel card 154A.

Upon obtaining the request (e.g., the command), remote system 104A may identify proprietary software (e.g., that relies on proprietary logic) associated with channel card 154A. Remote system 104A may use the proprietary logic of the proprietary software (e.g., run proprietary algorithms, use proprietary data) to convert the command to a non-standard function customized command.

The non-standard function customized command may be natively executable by channel card 154A. For example, the non-standard function customized command may include instructions additional (e.g., appended) to existing instructions of the command to obtain the non-standard function customized command. The non-standard function customized command may include instructions that may improve the coordinated operation of components of the data processing system in view of non-standard functions of channel card 154A.

Returning to the performance sound card example, a processor of the data processing system may issue commands for depowering the data processing system. For example, time-dependent shutdown commands may be issued by the processor to specific hardware components of hardware resources 150 (e.g., power controllers). The time-dependent shutdown commands may be pre-programmed at a time of manufacturing of the data processing system based, at least in part, on the stock hardware components present at the time of manufacturing. However, the performance sound card (not present at the time of manufacturing) may require additional time to perform shut-down related functions associated with its non-standard functions. For example, to avoid data loss, the performance sound card may require additional time to clear cached data from memory and/or to offload data to persistent storage.

Therefore, proprietary software for converting commands issued to the performance sound card (e.g., controlled exclusively by remote system 104A) may be configured to modify amounts of time specified in the shutdown instructions and/or remote system 104A may instruct management controller 152 to hold intercepted depowering commands for a period of time.

At interaction 258, a response (e.g., including the non-standard function customized command and/or other information or instructions) may be provided to management controller 152 by remote system 104A using methods similar to those described with respect to interaction 216 of FIG. 2A and/or by other methods. Upon obtaining the response, management controller 152 may read instructions and/or perform other actions. For example, management controller 152 may be equipped with software for managing (e.g., tracking, ordering) commands obtained from remote system 104A and/or other sources (e.g., hardware resources 150) before forwarding/issuing the commands. In other words, management controller 152 may insert the non-standard function customized command into an execution flow for commands issued to channel card 154A. The execution flow may be modified by management controller 152 using transparently to (e.g., without notifying) channel card 154A.

At interaction 260, the modified command (e.g., the non-standard function customized command, included in the execution flow) may be provided to channel card 154A by management controller 152 by (i) transmission via a message, (ii) storing in a storage with subsequent retrieval by channel card 154A, (iii) a publish-subscribe system where channel card 154A subscribes to updates from management controller 152 thereby causing a copy of the modified command to be propagated to channel card 154A, and/or (iv) other processes. The modified command may be provided, for example, via sideband channel 174A (e.g., a communication channel similar to sideband channel 174 of FIG. 1B).

Upon obtaining the modified command, channel card 154A may perform execution process 262. During execution process 262, channel card 154A may execute instructions included in the modified command and/or other instructions (e.g., stored locally) to participate in provision of a computer-implemented service. By doing so, a non-standard function of channel card 154A may be utilized to provide user desired computer-implemented services without re-configuring operation of hardware resources 150.

Thus, the processes and interactions shown in FIG. 2B, non-standard functions of channel cards may be invoked using out-of-band methods and proprietary software. To do so, a management controller of a data processing system may communicate with a remote system that manages and controls proprietary logic for performing command modification via out-of-band communication channels. By doing so, the non-standard functions may be utilized without providing the data processing system with access to the proprietary logic and without the commands (and/or the modified commands) traversing hardware resources 150 during command modification process 254, thereby reducing a likelihood of compromise of the modified commands and/or hardware resources 150.

While described with respect to the remote system hosting the proprietary software and providing services using the proprietary software (e.g., command modification services) via out-of-band methods, it will be appreciated that the remote system may provide a licensed copy of the proprietary software to the management controller (e.g., via out-of-band methods). The proprietary software may be hosted locally on the management controller and used by the management controller to provide the services using the proprietary software.

While described with respect to a management controller, it will be appreciated that other hardware and/or software configurations may be possible. For example, a piece of software running on the host system (e.g., hardware resources of the data processing system) may perform all or a portion of functions performed by the management controller.

Turning to FIG. 2C, a third interaction diagram in accordance with an embodiment is shown. The third interaction diagram may illustrate processes and interactions that may occur during conversion of a channel card configured to perform at least one non-standard function (e.g., a non-standard channel card) to a standard channel card (e.g., a channel card configured to perform standard functions and not configured to perform non-standard functions). After the conversion of the non-standard channel card to the standard channel card, the converted channel card may be prompted to generate a new public private key pair. The new public private key pair may replace and/or supersede the first public private key pair used to invoke the non-standard functions of the channel card.

Consider a scenario in which channel card 154A is a non-standard channel card. Channel card 154A may be previously identified as operably connected to the data processing system (e.g., by a BIOS during a startup procedure for the data processing system) and management controller 152 (and/or another entity) may have previously performed a function identification process to determine that channel card 154A provides at least one non-standard function (e.g., via a process similar to non-standard channel card identification process 200 described in FIG. 2A). To invoke the at least one non-standard function, the non-standard channel card may include (e.g., store in local storage) a first public private key pair. The first public private key pair may be usable to verify the non-standard channel card is entitled to use of proprietary software required to invoke the non-standard functions.

Following identification of channel card 154A as a non-standard channel card, management controller 152 may perform user input analysis process 270 to determine whether channel card 154A is to be converted to a standard channel card. During user input analysis process 270, at least interactions 272 and 274 may be performed. To determine whether channel card 154A is to be converted to a standard channel card, management controller 152 may interact with and/or assume control over one or more of hardware components 156. Management controller 152 may be tasked with managing hardware resources 150 and, therefore, may be able to assume control of (e.g., provide commands to, modify configurations of) any of hardware resources 150.

Hardware resources 150 may include at least hardware components 156 and channel card 154A. Hardware components 156 may include at least a display of data processing system 102 and/or one or more human interface devices (HIDs) such as a mouse, a keyboard, etc. By assuming control of the display, management controller 152 may present one or more graphical user interfaces (GUIs) to the user via the display, the user being able to interact with the GUIs using the one or more HIDs. By assuming control over the HIDs, management controller 152 may obtain user input provided via the HIDs and/or the GUIs.

At interaction 272, a request for user input may be provided to hardware components 156 by management controller 152. The request for user input may include instructions for generating and presenting a GUI to the user, the GUI including selectable options regarding whether channel card 154A is to be converted to a standard channel card. For example, the GUI may present an identifier for channel card 154A, a rationale for converting channel card 154A to a standard channel card (e.g., to improve performance and/or availability of support for channel card 154A), and selectable icons (e.g., yes, no) to collect the user input.

For example, the request for the user input may be generated and provided to hardware components 156 via (i) transmission via a message (e.g., via a sideband channel similar to sideband channels 174 described in FIG. 1B), (ii) storing in a storage with subsequent retrieval by hardware components 156, (iii) via a publish-subscribe system where hardware components 156 subscribes to updates from management controller 152 thereby causing a copy of the request for user input to be propagated to hardware components 156, and/or via other processes. By providing the request for user input to hardware components 156, hardware components 156 may provide GUI display and HID feedback collection services.

At interaction 274, the user input may be provided to management controller 152 by hardware components 156. For example, the user input may be collected and provided to management controller 152 via (i) transmission via a message (e.g., via a sideband channel similar to sideband channels 174 described in FIG. 1B), (ii) storing in a storage with subsequent retrieval by management controller 152, (iii) via a publish-subscribe system where management controller 152 subscribes to updates from hardware components 156 thereby causing a copy of the user input to be propagated to management controller 152, and/or via other processes. The user input may include a data structure indicating selections chosen by the user via an interaction with the GUI presented to the user and/or via the user's interaction with the HIDs. By providing the user input to management controller 152, management controller 152 may provide channel card conversion services.

Following receipt of the user input at interaction 274 and during user input analysis process 270, management controller 152 may read the user selections included in the user input and may determine, based on the user input, whether channel card 154 is to be converted from a non-standard channel card to a standard channel card.

For example, if the user input indicates that the user does not approve a conversion of channel card 154A to a standard channel card, management controller 152 may continue to facilitate provision of command modification services using proprietary software controlled by a remote system (e.g., remote system 104A, not shown, via methods similar to those described in FIG. 2B).

In FIG. 2C, the user input may indicate that the user approves a conversion of channel card 154A to a standard channel card and, therefore, management controller 152 may proceed to interact with remote system 104B to obtain a certificate for the standard channel card.

Remote system 104B may include any number of systems remote to data processing system 102 and may be managed by a manufacturer/vendor of data processing system 102. Remote system 104B may interact with management controller 152 to verify that the user of data processing system 102 is authorized to use firmware for a standard channel card (e.g., the user has an active license for the firmware). Remote system 104B may, therefore, generate and/or store certificates and may provide the certificates to management controller 152 via the out-of-band communication channel.

To obtain the certificate for the standard channel card, management controller 152 may perform certificate retrieval process 276. The certificate for the standard channel card may include a cryptographically verifiable data structure delegating a right to user firmware associated with the standard channel card to the user. The certificate may include, for example, a statement indicating that the user has an active license to use the firmware for the standard channel card and the certificate may be signed using a private key of a second public private key pair kept secret by remote system 104B and/or the manufacturer of the data processing system. Therefore, the certificate may be cryptographically verifiable via use of a second public key of the second public private key pair to verify that the certificate was signed using the second private key of the second public private key pair.

The firmware associated with the standard channel card may be usable to activate the standard functions. However, the firmware associated with the standard channel card may not be usable to activate any non-standard functions of the channel card 154A. During certificate retrieval process 276, at least interactions 278 and 280 may occur.

At interaction 278, a request may be provided to remote system 104B by management controller 152 via an out-of-band communication channel (e.g., similar to channel 172 described in FIG. 1B). The request may include an identifier for channel card 154A, an identifier for the user, instructions for remote system 104B to verify firmware that the user is authorized to use, and/or other information.

For example, the request may be generated and provided to remote system 104B via (i) transmission via a message, (ii) storing in a storage with subsequent retrieval by remote system 104B, (iii) via a publish-subscribe system where remote system 104B subscribes to updates from management controller 152 thereby causing a copy of the request to be propagated to remote system 104B, and/or via other processes.

Following receipt of the request by remote system 104B, remote system 104B may determine whether the user (e.g., via the identifier for the user) has a right to use the firmware for the standard channel card that was requested by the request. To do so, remote system 104B may search an internal (and/or remote) database for a record of the user having purchased and/or subscribed thereby having an active license for the firmware for the standard channel card. If the user does not have a right to use the firmware for the standard channel card, remote system 104B may interact with management controller 152 to determine whether the user wishes to obtain the right to use the firmware for the standard channel card. Doing so may include interactions similar to those described with respect to user input analysis process 270 (e.g., presenting a GUI to the user, obtaining user input via the GUI and/or via any number of HIDs).

If remote system 104B identifies that the user has the right to use the firmware for the standard channel card (e.g., the user is listed as an authorized user of the firmware for the standard channel card), remote system 104B may provide the certificate to management controller 152 at interaction 280 via the out-of-band channel. Remote system 104B may generate the certificate and/or may retrieve a previously generated certificate from storage. For example, the certificate may be generated and provided to management controller 152 via (i) transmission via a message, (ii) storing in a storage with subsequent retrieval by management controller 152, (iii) via a publish-subscribe system where management controller 152 subscribes to updates from remote system 104B thereby causing a copy of the certificate to be propagated to management controller 152, and/or via other processes. By providing the certificate to management controller 152, management controller 152 may store a copy of the certificate and may use the certificate to approve performance of a conversion process for channel card 154 to obtain a converted channel card.

Following obtaining the certificate and to convert channel card 154 to a standard channel card, management controller 152 may provide conversion instructions to channel card 154A at interaction 284. The conversion instructions may include (i) instructions to delete existing firmware of channel card 154A, (ii) instructions for installing a copy of the firmware for the standard functions (e.g., along with executable code for installing the firmware for the standard functions), (iii) instructions for generating a new public private key pair, and/or (iv) other instructions.

For example, the conversion instructions may be generated and provided to channel card 154A via (i) transmission via a message, (ii) storing in a storage with subsequent retrieval by channel card 154A, (iii) via a publish-subscribe system where channel card 154A subscribes to updates from management controller 152 thereby causing a copy of the conversion instructions to be propagated to channel card 154A, and/or via other processes. By providing the conversion instructions to channel card 154A, channel card 154A may perform at least a portion of an action set to convert the non-standard channel card to the standard channel card.

For example, to convert channel card 154A to the standard channel card, channel card 154A may perform conversion process 282. During conversion process 282, channel card 154A may (i) obtain a copy of the firmware for the standard channel card and/or instructions for installing the firmware for the standard channel card, (ii) delete existing firmware and replace the existing firmware with the firmware for the standard channel card, (iii) generate a new public private key pair to replace and/or supersede the first public private key pair used to invoke the non-standard functions of the channel card, (iv) store the private key of the new public private key pair in local storage, (v) provide the public key of the new public private key pair to remote system 104B (e.g., via management controller 152 and an out-of-band communication channel) so that remote system 104B may verify channel card 154A is entitled to use of the firmware for the standard functions in the future, and/or (vi) perform other actions.

For example, a user of a data processing system may replace a standard sound card (e.g., an integrated sound card) with a non-standard sound card (e.g., a performance sound card). The non-standard sound card may include a first public private key pair, which may include a private key usable to verify entitlement to use of proprietary software required to invoke non-standard functions (e.g., data caching, data processing) controlled by a manufacturer of the non-standard sound card. However, use of the proprietary software may consume an undesirable quantity of computing resources. In addition, management controller 152 may limit access by the non-standard channel card to other hardware components of the data processing system due to a lack of trust for the non-standard channel card. Consequently, availability of at least a portion of the functions performed by the non-standard channel card may be limited. Thus, the user may convert the non-standard sound card to a standard sound card, which may require firmware to invoke standard functions controlled by a manufacturer of the data processing system.

After the conversion, a management controller of the converted sound card may prompt the converted sound card to generate a new public private key pair. A private key of the new public private key pair may be stored locally on the converted sound card, and a public key of the new public private key pair may be provided to the manufacturer of the data processing system. The new public private key pair may replace the first public private key pair stored by the converted sound card, which may disable future use of non-standard functions (e.g., the converted sound card may no longer be entitled to use of the proprietary software). The private key of the new public private key pair may be used in the future to demonstrate entitlement to firmware required to use the standard functions (e.g., to the manufacturer of the data processing system).

Following conversion process 282, management controller 152 may (i) delete and/or archive software and/or data structures previously used to manage functions of channel card 154A, (iii) perform additional actions to prevent future instances of activation of non-standard functions of channel card 154A (not shown), and/or (iv) perform other actions. To prevent future instances of activation of the non-standard functions of channel card 154A, management controller 152 may monitor (e.g., continuously, at regular intervals) firmware installed on channel card 154A and may take action to remove any firmware that is not the firmware for the standard functions.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor-based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIGS. 1A-2C may perform various methods to manage the operation of data processing systems. FIG. 3 illustrates a method that may be performed by the components of the system of FIGS. 1A-2C. In the diagram discussed below and shown in FIG. 3, any of the operations may be repeated, performed in different orders, and/or performed in parallel with or in a partially overlapping in a timely manner with other operations. The method described with respect to FIG. 3 may be performed by a data processing system, any component of a data processing system (e.g., a management controller, hardware resources, a security processor) and/or another device.

Turning to FIG. 3, a flow diagram illustrating a method in accordance with an embodiment is shown. The flow diagram may illustrate various operations performed while managing operation of a data processing system. The data processing system may include hardware resources and a management controller, and may be similar to the data processing system discussed with respect to FIGS. 1A-1B.

At operation 300, an identification may be made that a channel card of a data processing system is a non-standard channel card, the non-standard channel card being configured to perform at least one non-standard function. Making the identification may include (i) determining, during a startup procedure for the data processing system, that a new hardware component has been operably connected to the data processing system (e.g., during a secured component verification process and/or via receiving a notification from a startup management entity such as a BIOS), (ii) obtaining a list of functions of the channel card (e.g., requesting the list of functions from the channel card, querying another entity for the list of the functions by retrieving a serial number for the channel card and providing the serial number to the entity, (iii) comparing the list of functions to a list of standard functions based on a type of the channel card (e.g., based on an industry standard), (iv) if any functions of the list of functions do not match the list of standard functions, concluding that the channel card is the non-standard channel card, and/or (v) other methods.

At operation 302, a management controller of the data processing system may obtain a signed data structure indicating an entitlement for the channel card, the signed data structure including a signature usable to verify the channel card is entitled to use of proprietary software. The proprietary software may be controlled exclusively by a remote system (e.g., a system operated by a manufacturer of the channel card) and may include software that implements proprietary logic to invoke the non-standard functions of the channel card.

Obtaining the signed data structure may include (i) providing, by the management controller, a request to the channel card, the request challenging the channel card to demonstrate entitlement to use of the proprietary software, (ii) obtaining, from the channel card, a response, the response including the signed data structure signed using a private key of a public private key pair maintained by the channel card (e.g., the first private key of the first public private key pair usable to demonstrate entitlement for the channel card), and/or (iii) other methods.

The entitlement may dictate a type of proprietary software that the channel card is entitled to use, and the type of proprietary software may dictate which non-standard functions of the non-standard channel card are allowed to be invoked by the data processing system. For example, the channel card may only be allowed access to a portion of the non-standard functions the channel card is capable of performing, and thus, may only be entitled to a type of the proprietary software usable to invoke the allowed portion of the non-standard functions.

Providing the request to the channel card may include (i) encapsulating the request in a message, (ii) transmitting the message across a sideband channel of the data processing system to the channel card, (iii) storing the request in storage and providing the channel card with instructions to retrieve the request, and/or (iv) other methods.

Obtaining the response may include (i) receiving the response in the form of a message (e.g., from the channel card and via a sideband channel), (ii) reading the response from storage, and/or (iii) other methods.

At operation 304, the management controller may perform, via at least an out-of-band interaction with the remote system, a verification process to determine whether the signed data structure is usable to establish the entitlement. Performing the verification process may include (i) sending, by the management controller, the signed data structure to the remote system via an out-of-band communication channel (e.g., transmitting the signed data structure via a message, storing the signed data structure in a storage with subsequent retrieval by the remote system), (ii) receiving, from the remote system and via the out-of-band communication channel, a response indicating whether the signed data structure is usable to establish the entitlement (e.g., receiving the response in a message, reading the response from storage), and/or (iii) other methods. For example, the management controller may send the signed data structure to the remote system and receive the response using methods described with respect to interactions 214 and 216 of FIG. 2A, respectively, and/or by other methods.

The management controller may also perform at least a portion of the verification process locally. In that case, performing the verification process may also include using a first public key (e.g., stored within a storage used by the management controller to store trusted public keys) of a first public private key pair to verify that the signed data structure was signed using a first private key of the first public private key pair.

At operation 306, it may be determined whether the signed data structure is usable to establish the entitlement. Determining whether the signed data structure is usable to establish the entitlement may include parsing the response from the remote system to ascertain whether the response indicates the establishment of the entitlement. The response may indicate the establishment of the entitlement if the private key used by the channel card to sign the signed data structure can be cryptographically verified by the remote system using a corresponding public key of a first public private key pair.

If it is determined that the signed data structure is usable to establish the entitlement (e.g., the determination is "Yes" at operation 306), then the method may proceed to operation 308.

At operation 308, computer-implemented services may be provided using the channel card and the proprietary software. For example, the proprietary software may be usable to modify commands to invoke the non-standard functions of the channel card. In this example, providing the computer-implemented services may include (i) screening commands by the management controller, the commands issued by hardware resources of the data processing system to identify a command that implicates use of a non-standard function of the channel card, (ii) modifying the command using the proprietary software to obtain a non-standard function customized command that is natively executable by the channel card, (iii) initiating execution of the non-standard function customized command by the channel card to facilitate provisioning of the computer-implemented services, and/or (iv) other methods.

The method may end following operation 308.

Returning to operation 306, if it is determined that the signed data structure is not usable to establish the entitlement (e.g., the determination is "No" at operation 306), then the computer-implemented services may be provided without invoking the non-standard functions of the channel card.

The method may end following operation 306.

Thus, as illustrated above, embodiments disclosed herein may provide systems and methods usable to manage operation of a data processing system using a management controller to facilitate establishment of an entitlement to use proprietary software, the proprietary software usable to invoke non-standard functions of a channel card. By doing so, the entitlement of the channel card to use of the proprietary software may be verified, which may allow the non-standard functions of the channel card to be utilized in the provision of computer-implemented services.

Figure 4:
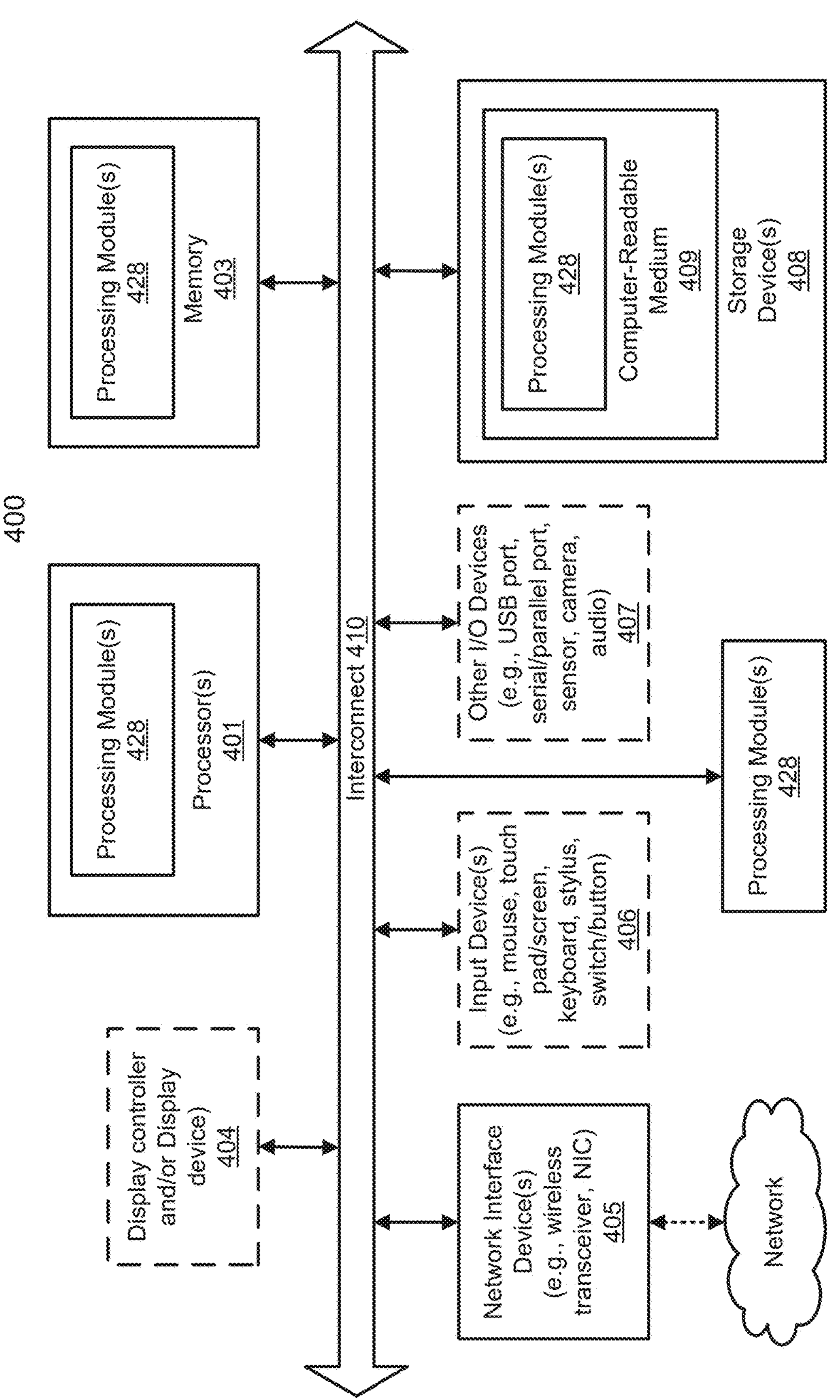
FIG. 4 shows a block diagram illustrating a data processing system in accordance with an embodiment.

Any of the components illustrated in FIGS. 1A-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a data processing system, the method comprising:
- making an identification that a channel card of the data processing system is a non-standard channel card, the non-standard channel card being configured to perform at least one non-standard function;
- based on the identification:
  - obtaining, by a management controller of the data processing system, a signed data structure indicating an entitlement for the channel card, the signed data structure comprising a signature usable to verify the channel card is entitled to use of proprietary software;
  - performing, by the management controller and via at least an out-of-band interaction with a remote system, a verification process to determine whether the signed data structure is usable to establish the entitlement; and
  - in an instance of the verification process in which the signed data structure is usable to establish the entitlement:
    - providing, using the channel card and the proprietary software, computer-implemented services,
- wherein obtaining the signed data structure comprises:
  - providing, by the management controller, a request to the channel card, the request challenging the channel card to demonstrate entitlement to use of the proprietary software; and
  - obtaining, from the channel card, a response, the response comprising the signed data structure signed using a private key of a public private key pair maintained by the channel card.

2. The method of claim 1, wherein performing the verification process comprises:

sending, by the management controller, the signed data structure to the remote system via an out-of-band communication channel; and receiving, from the remote system and via the out-of-band communication channel, a response indicating whether the signed data structure is usable to establish the entitlement.

3. The method of claim 1, wherein the entitlement dictates a type of proprietary software that the channel card is entitled to use, and the type of proprietary software dictates which non-standard functions of the channel card are allowed to be invoked by the data processing system.

4. The method of claim 1, wherein use of the proprietary software is controlled exclusively by the remote system.

5. The method of claim 1, wherein the remote system is a system operated by a manufacturer of the channel card.

6. The method of claim 1, wherein the management controller is separate from and tasked with managing operation of hardware resources, the hardware resources comprising at least the channel card.

7. The method of claim 1, wherein the obtaining is performed via sideband channels of the data processing system.

8. The method of claim 1, wherein the non-standard function of the channel card is based on standard functions of a type of channel card, and the standard functions of the type of the channel card are based on an industry standard with which the channel card is compliant.

9. The method of claim 8, wherein the non-standard function is a capability of the channel card that is additional to those of the industry standard, and is not natively invokable by hardware resources and software hosted thereon.

10. The method of claim 1, wherein the identification is made by a basic input/output system (BIOS) of the data processing system during a startup procedure for the data processing system.

11. A non-transitory machine-readable medium having instructions stored therein, which when executed by a processor, cause the processor to perform operations for managing operation of a data processing system, the operations comprising:

making an identification that a channel card of the data processing system is a non-standard channel card, the non-standard channel card being configured to perform at least one non-standard function;

based on the identification:

obtaining, by a management controller of the data processing system, a signed data structure indicating an entitlement for the channel card, the signed data structure comprising a signature usable to verify the channel card is entitled to use of proprietary software;

performing, by the management controller and via at least an out-of-band interaction with a remote system, a verification process to determine whether the signed data structure is usable to establish the entitlement; and in an instance of the verification process in which the signed data structure is usable to establish the entitlement:

providing, using the channel card and the proprietary software, computer-implemented services, wherein obtaining the signed data structure comprises:

providing, by the management controller, a request to the channel card, the request challenging the channel card to demonstrate entitlement to use of the proprietary software; and obtaining, from the channel card, a response, the response comprising the signed data structure signed using a private key of a public private key pair maintained by the channel card.

12. The non-transitory machine-readable medium of claim 11, wherein performing the verification process comprises:

sending, by the management controller, the signed data structure to the remote system via an out-of-band communication channel; and receiving, from the remote system and via the out-of-band communication channel, a response indicating whether the signed data structure is usable to establish the entitlement.

13. The non-transitory machine-readable medium of claim 11, wherein the entitlement dictates a type of proprietary software that the channel card is entitled to use, and the type of proprietary software dictates which non-standard functions of the channel card are allowed to be invoked by the data processing system.

14. The non-transitory machine-readable medium of claim 11, wherein use of the proprietary software is controlled exclusively by the remote system.

15. The non-transitory machine-readable medium of claim 11, wherein the remote system is a system operated by a manufacturer of the channel card.

16. The non-transitory machine-readable medium of claim 11, wherein the management controller is separate from and tasked with managing operation of hardware resources, the hardware resources comprising at least the channel card.

17. A data processing system, comprising:

a processor; and a memory coupled to the processor to store instructions, which when executed by the processor, cause the processor to perform operations for managing operation of a data processing system, the operations comprising:

making an identification that a channel card of the data processing system is a non-standard channel card, the non-standard channel card being configured to perform at least one non-standard function;

based on the identification:

obtaining, by a management controller of the data processing system, a signed data structure indicating an entitlement for the channel card, the signed data structure comprising a signature usable to verify the channel card is entitled to use of proprietary software;

performing, by the management controller and via at least an out-of-band interaction with a remote system, a verification process to determine whether the signed data structure is usable to establish the entitlement; and in an instance of the verification process in which the signed data structure is usable to establish the entitlement:

providing, using the channel card and the proprietary software, computer-implemented services, wherein obtaining the signed data structure comprises:

providing, by the management controller, a request to the channel card, the request challenging the channel card to demonstrate entitlement to use of the proprietary software; and obtaining, from the channel card, a response, the response comprising the signed data structure signed using a private key of a public private key pair maintained by the channel card.

18. The data processing system of claim 17, wherein performing the verification process comprises:

sending, by the management controller, the signed data structure to the remote system via an out-of-band communication channel; and receiving, from the remote system and via the out-of-band communication channel, a response indicating whether the signed data structure is usable to establish the entitlement.

19. The data processing system of claim 17, wherein the entitlement dictates a type of proprietary software that the channel card is entitled to use, and the type of proprietary software dictates which non-standard functions of the channel card are allowed to be invoked by the data processing system.

20. The data processing system of claim 17, wherein use of the proprietary software is controlled exclusively by the remote system.

* * * * *